United States Patent [19]
Benson

[11] 3,918,848
[45] Nov. 11, 1975

[54] FLUID PRESSURE ENERGY TRANSLATING DEVICE

[75] Inventor: William J. Benson, Camarillo, Calif.
[73] Assignee: Abex Corporation, New York, N.Y.
[22] Filed: Jan. 7, 1974
[21] Appl. No.: 431,071

Related U.S. Application Data
[63] Continuation of Ser. No. 247,950, April 22, 1972.

[52] U.S. Cl. ............................................. 417/292
[51] Int. Cl. ........................................... F04b 49/00
[58] Field of Search ................................ 417/292

[56] References Cited
UNITED STATES PATENTS

| | | | |
|---|---|---|---|
| 2,716,946 | 9/1955 | Hardy | 417/292 X |
| 2,757,612 | 8/1956 | Shaw | 91/503 |
| 3,180,266 | 4/1965 | Smith | 417/292 X |
| 3,738,228 | 6/1973 | Harrison | 91/499 |

*Primary Examiner*—William L. Freeh
*Assistant Examiner*—G. P. LaPointe
*Attorney, Agent, or Firm*—Kinzer, Plyer, Dorn & McEachran

[57] ABSTRACT

An hydraulic pump or motor, accepting fluid at an inlet passage and translating the fluid to higher pressure at an outlet passage is constructed with a by-pass line communicating the inlet and outlet. A valve member, responsive to an abnormal condition, normally closes the by-pass line; but in the event an abnormal condition is sensed, such as abnormally high temperature or pressure, the valve is set to a position where the by-pass line is opened, whereupon the working members of the device merely circulate fluid between the passages.

1 Claim, 7 Drawing Figures

FLUID PRESSURE ENERGY TRANSLATING DEVICE

This is a continuation of application Ser. No. 247,950, filed Apr. 22, 1972.

This invention relates to a pump (or motor) constituting a fluid pressure energy translating device having a working member which translates low pressure fluid at an inlet passage into high pressure fluid delivered at an outlet passage; more specifically an hydraulic pump.

Some aircraft hydraulic systems are designed with isolation loops which isolate the individual pumps in the event of system malfunction. In this event, shut-off valves foreclose delivery of fluid to the pump inlet and foreclose delivery of pressurized fluid from the outlet to the area of application; but the pump is to be allowed to operate. Consequently the pump continues to deliver against a constantly increasing back pressure; an abnormal increase in temperature takes place within the pump, and concurrently the working members of the pump encounter abnormal resistance far beyond design limitations. The pump if overworked, is likely to result in damage if not outright pump failure. The cost of repair is not inconsiderable, to say nothing of the labor cost in extracting the pump from a remote, restricted compartment.

The primary object of the present invention is to preclude such failure and the consequences noted by constructing and equipping a fluid pressure translating device of the kind involved so that the inlet and outlet passages will be connected in the event of an abnormal operating condition characterized by abnormal temperature or abnormal pressure. The result is the pump simply circulates fluid through itself, from one passage to the other.

Specifically, it is an object of the present invention to present a by-pass between the inlet and outlet passages and interpose therein a valve member which closes the by-pass so long as normal conditions prevail while opening the by-pass in the event an abnormal operating condition is encountered. Yet more specifically the object just stated is attained by opposing means which hold or confine the valve member to a normal position, closing the by-pass, one means overpowering the other when an abnormal condition of fluid flow prevails resulting in the valve being set to open the by-pass so that the inlet and outlet passages are communicated.

Several embodiments of the invention are set forth; others may be utilized. In one embodiment, normal operating pressure in conjunction with a spring force are imposed as a balanced force on the valve, permissive of the valve standing in its first position closing the by-pass; but if the pressures attain an abnormal value, the locating forces are unbalanced and the valve is set to its second position. Specifically, as to this embodiment, the pressure is inlet pressure applied to a slide valve, and if inlet pressure diminishes the spring force is the overpowering force which sets the valve to its second position; but it could be another way in that outlet pressure, abnormally high, moves the valve to its second position against the return action of a spring also acting on the slide valve.

In a second (preferred) embodiment, the valve is also a slide valve located in its first position by a biasing spring. A thermal sensor normally serves as a limiting member, and expands upon an abnormal temperature to shift the slide valve to its second position against the return action of the spring. The thermal sensor must be reversible (contracting on cooling) in order for the spring to return the slide valve to its normal position when the pump resumes normal operation.

Other and further objects of the present invention will be apparent from the following description and claims and are illustrated in the accompanying drawings which, by way of illustration, show a preferred embodiment of the present invention and the principle thereof and what is now considered to be the best mode contemplated in applying that principle. Other embodiments of the invention embodying the same or equivalent principle may be used and structural changes may be made as desired by those skilled in the art without departing from the present invention.

Figure 1:
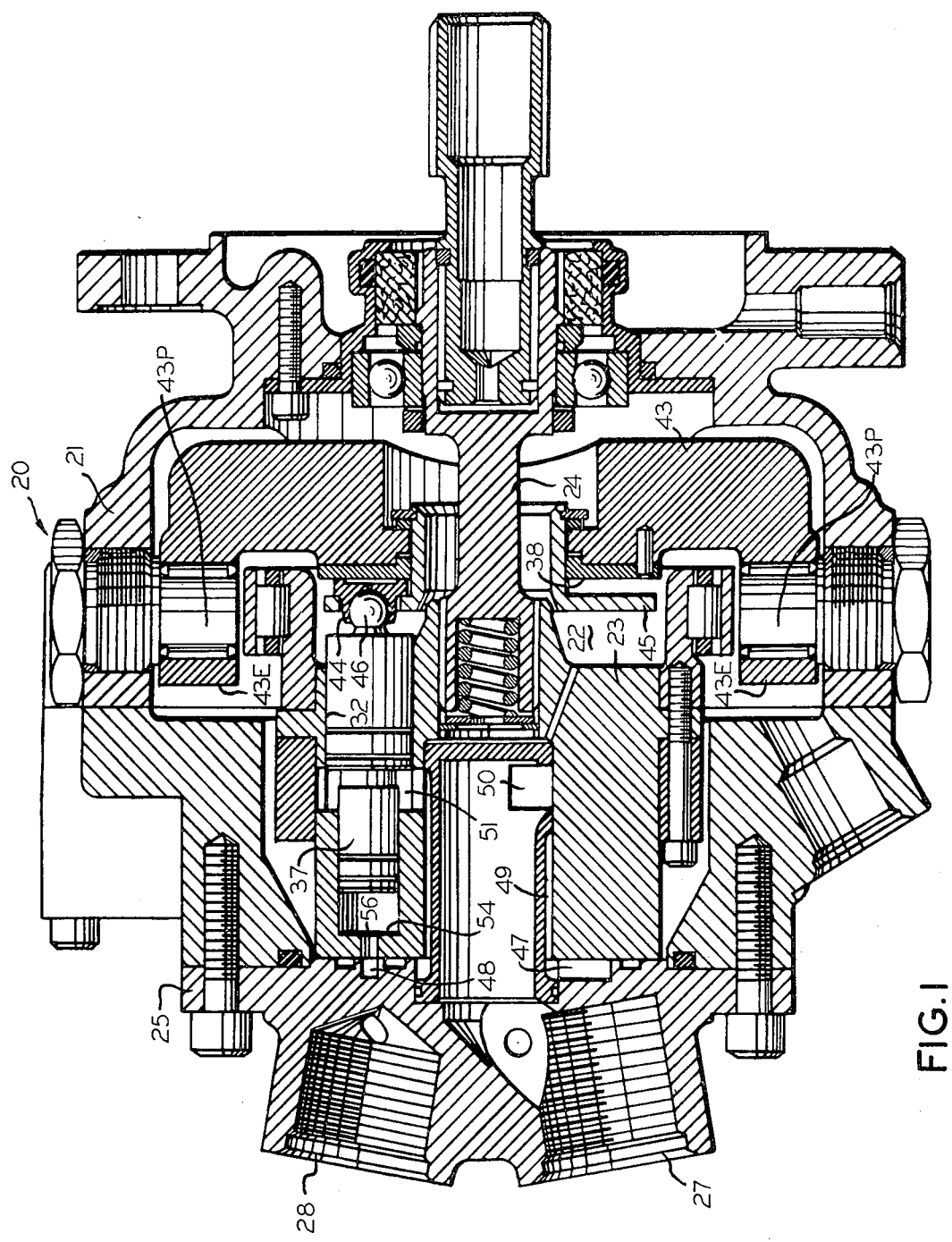
FIG. 1 is a sectional view of a known pump.

The present invention in its preferred embodiment is applied to a fluid pressure energy translating device 20, FIG. 1, in the form of a hydraulic pump the operation of which is disclosed more specifically in U.S. Pat. No. 2,835,228. The device could be operated as well in the reverse sense, serving as a hydraulic motor. Consequently, a brief description of construction and operation will suffice to explain a typical environment in which the present invention may be utilized.

The pump 20 includes an outer housing 21 which affords an enlarged chamber 22 in which a cylinder barrel 23 is disposed for rotation. The cylinder barrel is rotated within the casing by a gear driven shaft 24 splined to the cylinder barrel.

The cylinder barrel has one end in flush slidable engagement with the opposed face of a port cap 25 fastened to the housing 21. The port cap has large threaded openings 27 and 28 constituting inlet and outlet passages to which conduits may be joined for conveying fluid to and from the pump, respectively. The cylinder barrel is formed with individual, stepped piston chambers or cylinders 32, and a stepped piston member 37 is disposed in each cylinder for reciprocation therein. Each piston is a working member effective to translate low pressure inlet fluid supplied to the inlet 27 into high pressure fluid delivered to the outlet 28 for further transmittal to the hydraulic system being serviced by pump 20. Both the supply fluid and delivery fluid have characteristic pressure and temperature conditions identified with normal operation.

A cam plate 38 is mounted within the casing 21 to be disposed at an angle relative to the axis of the cylinder barrel. This angle, not shown in FIG. 1, determines the displacement of the pistons as explained in the patent. The cam plate 38 is carried by a hanger 43 which has end members 43E pivotally mounted on trunnion pins 43P. The trunnion pins are mounted in the sides of the housing 21, and from this it will be seen that the cam plate may be tilted about the axes of the trunnion pins, FIG. 1, to account for piston displacement.

The pistons 37 are constrained to follow the cam plate 38 by means including bearing shoes 44 which have sliding contact with the cam plate 38. The shoes 44 are captured by openings in a retainer plate 45. The end of each piston adjacent the cam plate is provided with a ball 46 mounted for oscillation in a socket of the related shoe 44 thereby accounting for articulate reciprocation of the pistons as the cylinder barrel is rotated. The center of each ball 46 is spaced equally from the face of the cam plate on which the shoes 44 slide so each shoe is reciprocated equidistantly as the cylinder barrel is rotated.

Figure 4:
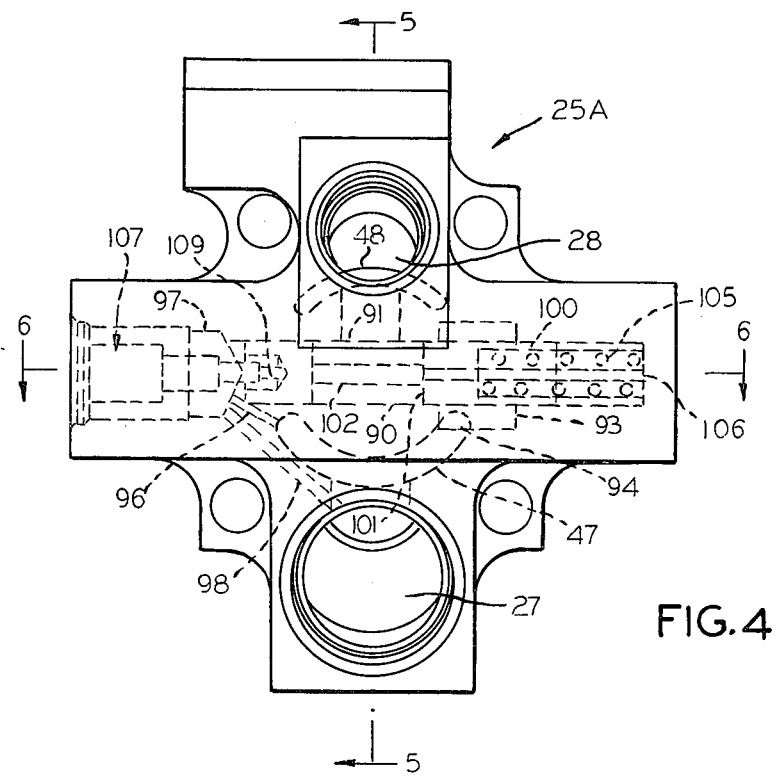
FIG. 4 is a front elevation of a port cap constructed in accordance with the present invention.
Figure 5:
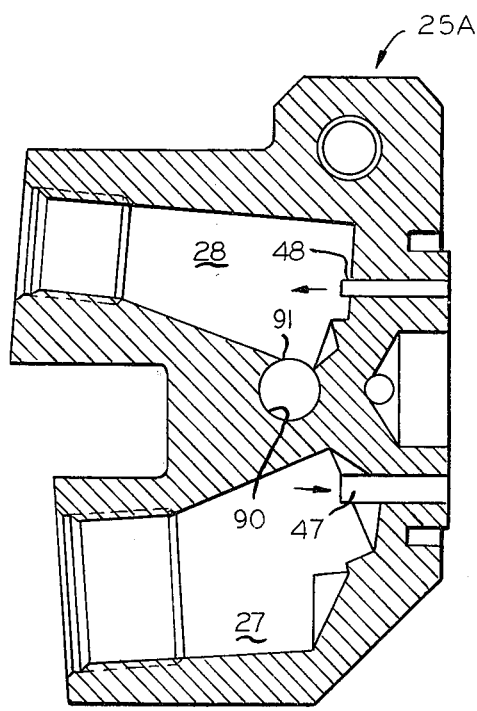
FIG. 5 is a sectional view on the line 5—5 of FIG. 4.

The port cap 25 has arcuate, mutually exclusive passages 47 and 48 constituting, respectively, an inlet and an outlet communicating with the inlet 27 and outlet 28, respectively. The nature of this communication is shown in FIGS. 4 and 5, and in this connection it is to be noted that FIG. 1 shows a known pump, while FIGS. 4 and 5 show a modified port cap 25A incorporating the present invention.

Inlet 27, FIG. 1, communicates with a hollow pintle 49 (fixed) having a port 50 at its inner end. This port registers during part of the revolution of the cylinder barrel with ports 51 which communicate with the larger sections of the piston cylinders.

The narrow sections (left ends) 54 of the cylinders 32 have openings 56 communicating alternately during rotation with the arcuate inlet and outlet passages 47 and 48 in the port cap 25 as explained in the patent. When a cylinder section 54 communicates with the inlet passage 47, the piston is enlarging the cylinder end 54 to permit fluid to pass from the inlet 47 through port 56 to the interior of the cylinder, and when section 54 of the cylinder communicates with the outlet passage 48 the piston 37 is in its contracting movement to discharge fluid under pressure to the outlet 48. Thus as a piston is compelled by the tilted cam plate to move away from a cylinder port 56, the port is valved to the inlet system 27–47 to allow fluid to displace into the expanding chamber 54; whereas the valving and timing is such that as a piston is forced in the opposite direction, fluid under pressure is translated through the port 56 to the outlet or discharge system 28–48. A similar translation of fluid occurs with respect to the larger sections of the cylinders, taking place via pintle 49 and port 51 as explained in the patent.

As an introduction to a commercial embodiment of the present invention, consideration will first be given to certain principles showing different ways of communicating the inlet and outlet of a pump in the event an abnormal operating condition is encountered. The abnormal condition may be a manifest pressure change or a manifest temperature change at either the inlet or outlet.

Figure 2:
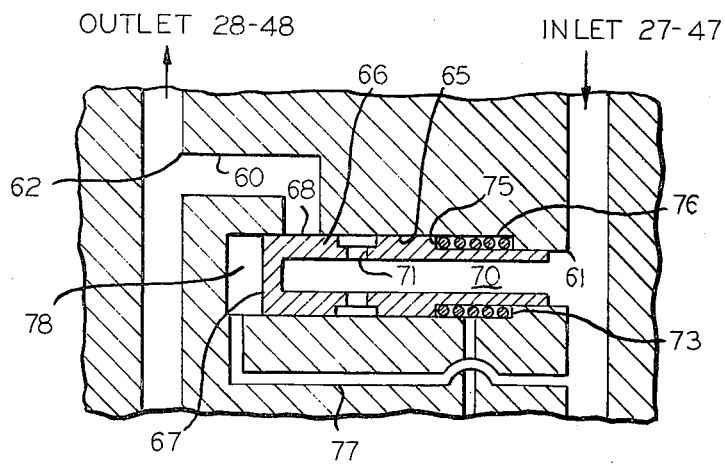
FIGS. 2 and 3 are schematic views showing two different embodiments of the invention.

Referring to FIG. 2, the inlet passages and outlet passages, referred to above, are diagrammed schematically and are shown as interconnected by a by-pass line 60, which may be of variant size and direction. The by-pass line 60 at one end communicates with the inlet by way of a port 61 and at the opposite end communicates with the outlet by way of a port 62. The by-pass line 60 includes an enlarged bore 65 between the inlet and outlet ports 61 and 62. A slide valve 66 is located for reciprocal movement in the bore 65. The slide valve 66 is in the form of a piston having an end wall 67 constituting the head of the piston. In its normal or first position, the piston 66 presents a land surface 68 thereof to the outlet side of the by-pass line. Consequently, the by-pass line is closed when the slide is in its closing attitude.

The slide has a valving passage in the form of an internal bore 70 communicating with port 61 which opens into the inlet, and a valving port 71 formed in the side wall of the valve slide 66. In the normal or closing attitude, port 71 is displaced from the by-pass line leading to the outlet.

The by-pass bore 65 includes an end wall 73. The side or circular wall of the slide valve 66 is recessed to present a wall 75. A compression spring 76 is mounted concentrically about the slide 66, the opposite ends of the spring engaging the walls 73 and 75, thereby tending to displace the slide 66 in a left-hand direction as viewed in FIG. 2 to present valve port 71 in an opening attitude to the by-pass line 60.

The by-pass bore 65 communicates with the inlet by way of a narrow passage 77, and consequently the pressure of the inlet fluid is communicated to an expansion chamber 78 at the piston head end of the by-pass bore 65, so that fluid pressure represented by the inlet establishes an opposing force on the head 67 of the piston in direct opposition to the directional force of the compression spring 76.

The rate of the spring is predetermined as sufficient, under normal operating conditions of inlet pressure, to balance the opposing force represented by pressure in the expansible chamber 78. So long as this normal balancing condition prevails, the by-pass line is closed by the slide valve 66 standing in its normal closing attitude. In the event, however, that there should be a substantial decrease in the supply of pressure prevailing at the inlet, the spring becomes an overbalancing force shifting the slide 66 leftward, contracting the expansible chamber 78 and setting the valve to its opening attitude where port 71 registers with the section of the by-pass line communicating with the outlet. Consequently, fluid delivered at the outlet is transmitted through the opened by-pass line 60 to the inlet, characterizing the mode of operation where fluid is translated from the outlet back to the inlet and through the pump in a constant circular route which prevails until a normal operating pressure condition once more is established at the inlet. When the normal operating condition is reestablished, increased (normal) inlet pressure is communicated to chamber 78, restoring the slide to its closing attitude against the return action of spring 76.

Thus it will be seen that the valve control is pressure responsive and comprises both a spring applying a force to the slide and an expansible chamber applying an opposing force represented by fluid pressure prevailing at the inlet. Normally the valve control locates the valve in its closing attitude, but sets the valve in its opening attitude in the event abnormally low inlet pressure is sensed. Abnormally low inlet pressure would prevail in the event the supply of flow to inlet 27 should fail, because the working members of the pump would promptly exhaust residual fluid residing at the inlet.

Figure 3:
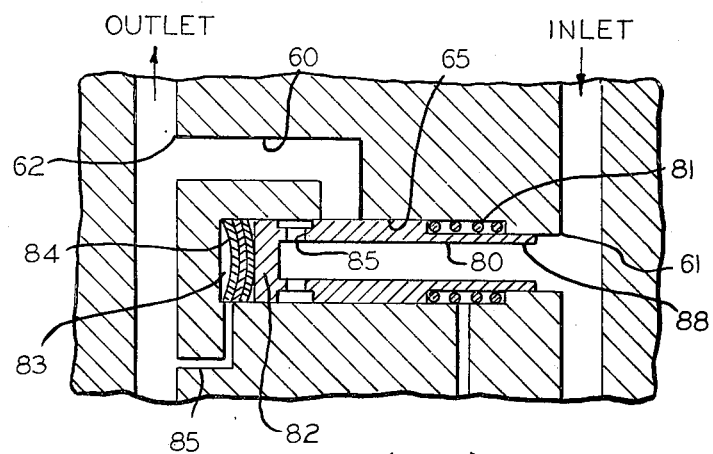

Referring to FIG. 3, the form of the by-pass line is the same as that described above in connection with FIG. 2, but the slide valve 80 in this instance is located in its closing attitude with respect to the by-pass line by a coil spring 81 which holds the head 82 of the slide against a thermal sensor in the form of a bimetal body 83, the latter being disposed in a chamber 84 at one end of the by-pass bore 65.

The sensing chamber 84 is communicated to the outlet by a narrow passage 85 and consequently the sensing chamber 84 is constantly submerged in the fluid being discharged under pressure, the sensor 83 constantly registering the temperature condition of the discharge fluid. In the event that fluid being discharged under pressure should somehow be blocked or obstructed during its transmission to the point of use, the pump nonetheless continues to work and in doing so may be viewed as pushing fluid against an immovable object. The temperature at the outlet therefore rises to an abnormal value, and consequently the bi-metal body expands establising a driving force on the head of the piston 80 in excess of the opposing force of the spring 81. The valve slide 80 is set or moved to the right, establishing communication between its valving port 85 and the by-pass line 60. As in the instance of the slide valve 66, valve 80 is provided with an internal passage 88 which communicates with the port 61. Resultantly, with valve 80 set in its opening attitude with respect to the by-pass line 60, the working members of the pump merely translate fluid from the outlet to the inlet and back through the pump itself.

The thermal sensor is of course one which expands on a rise in temperature and contracts or restores on a fall in temperature. There may be some vacillation in the sense of a contraction of the sensor 83 as the fluid cools during circulation through the pump, but once normalcy prevails at the outlet (obstruction removed) the bi-metal body will restore to a contracted state, and closing the by-pass line for normal operation.

The passage 85, FIG. 3, necessarily communicates high pressure fluid from the discharge outlet to the chamber 84. From this it will be seen that the bi-metal body 83 could be eliminated, relying upon normal pressure at the outlet, and in the event outlet pressure should rise to an abnormally high value, the slide 80 would be moved to the right and set in its opening attitude.

As noted above, one circumstance giving rise to the present invention is a failure in the hydraulic system serviced by a pump 20. The system failure is an abnormally high temperature at the inlet, and shut-off valves are actuated to close the supply line (to 27) and to close the delivery line (from 28). Therefore, the preference is to sense the temperature of the inlet and open the by-pass line in the event of an abnormally high inlet temperature as will now be described.

The present invention may be practiced commercially by resort to a modified port cap 25A, FIGS. 4 and 5, affording a by-pass line between the inlet and outlet passages. The by-pass line includes a transverse bore 90 ported at 91 to communicate with the discharge passage system 28-48. The bore 90, as shown in FIG. 4, extends rightward to an enlarged chamber 93 which in turn is ported at 94 to communicate with the arcuate inlet passage 47. Inlet passage 47 at the opposite side is joined by a passage 96 to an enlarged section 97 of the transverse bore 90. In turn, the enlarged bore section 97 is communicated by a narrow passage 98 back to inlet 27. Thus it will be seen that the outlet or discharge passage 28-48 communicates with bore 90 and the latter in turn is communicated to the inlet system 27-47.

Figure 6:
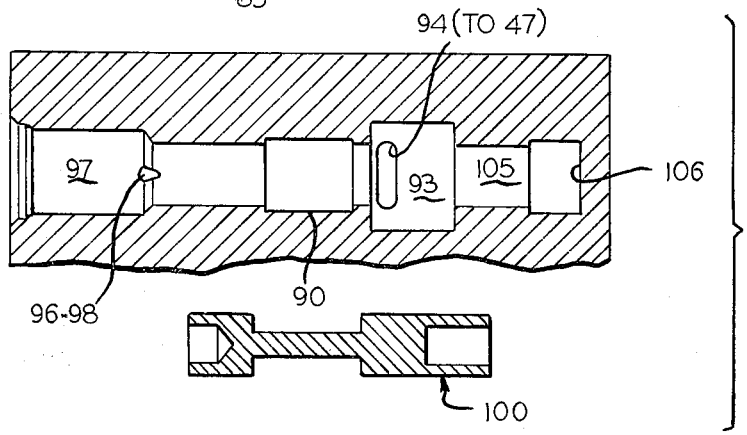
FIG. 6 is a composite sectional view on the line 6—6 of FIG. 4.

A valve member 100, FIGS. 4 and 6 is located in the bore 90 for reciprocal movement therein. The valve member 100 is of the spool type and includes a valving land 101 and a valving groove or reduced neck portion 102.

The valving member 100 is a two-position valve having a normal or first position where the valving land 101 obstructs the by-pass, specifically by the land 101 being positioned to disrupt communication between by-pass port 91 and by-pass port 94. Thus in the normal by-pass closing position, the valve land 101 is in fluid tight engagement in bore 90 between port 91 and chamber 93 which communicates with the inlet passage 47.

The valve member 100 is located and held in its normal position by a compression spring and an opposed thermal element. The thermal element is responsive to an abnormal temperature prevailing at the inlet to set valve 100 in its opening attitude, opening the by-pass. Thus as shown in FIG. 4, one end of the slide spool is recessed to accept one end of a compression spring 105, the opposite end of the spring being in engagement with an end wall 106 of the bore 90.

Figure 7:
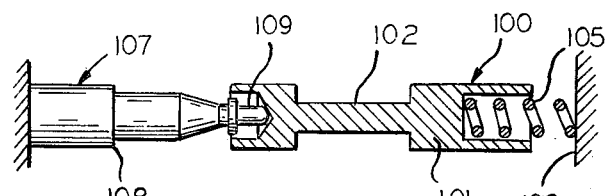
FIG. 7 is a simplified sectional view of parts located within the port cap of FIG. 4.

The end of the slide 100 opposite spring 105 is engaged by a thermally responsive driver 107 comprising a stepped cylinder 108 containing a temperature sensitive body which expands on heating and contracts on cooling. When the sensitive body expands, it extends a piston 109, FIG. 7, the free end of the latter being disposed in engagement with the left end of the slide 100, but under normal operating conditions the valve 100 is held firmly in its normal by-pass closing position between the compression spring and the extensible thermal element.

As noted above, the thermal element 107 is located in a housing or chamber 97 constituting an extension of the bore 90. Chamber 97 is constantly in communication with fluid entering the pump at the inlet opening 27, which is to say that inlet fluid is transmitted to chamber 97 through narrow passage 98 so that the thermal element is constantly submerged in the inlet fluid. Any abnormal rise in temperature extends the thermally responsive piston 109 which overbalances the spring force and moves the valve 100 rightward, FIG. 4, the dimensioning and response being such that valve land 101 is displaced well into the bore enlargement 93. Concomitantly, the valve passage or groove 102 is displaced into chamber 93, communicating port 91 to chamber 93. Consequently, the working members in the cylinder barrel of the pump displace fluid under pressure through bore 90 to port 94 leading to inlet 47, back through the pump cylinders to outlet and so on.

When the inlet temperature falls to normal, the piston 109 is retracted to its normal position and spring 105 restores the slide to its by-pass closing attitude.

It will be seen from the foregoing that the present invention enables a pump to circulate fluid merely from its own inlet to its own outlet in the event that an abnormal condition is sensed at the inlet or outlet in terms of abnormal temperature or abnormal pressure. This is accomplished by establishing a by-pass line between the inlet and outlet passages and interposing therein a normally closed valve having a land or wall normally closing one of the areas presented by the by-pass line. The land may be variantly located; and in the same sense the passageway of the valve member, which in the opening attitude of the valve establishes uninterrupted communication between the opposite ends of the by-pass line, may be internal or external as shown. The control, responsive to an abnormal condition, may be either temperature responsive or pressure responsive, sensing temperature or pressure at either the inlet or outlet. Consequently the embodiments disclosed may themselves be modified and altered as desired by those skilled in the art.

I claim:

1. In a hydraulic pump or motor apparatus where a working member inside a cylinder barrel translates low pressure fluid at an inlet passage into high pressure fluid delivered at an outlet passage and wherein said passages are formed in spaced, generally parallel relation within a port cap separably attached to one end of the cylinder barrel, the fluid thus translated having a characteristic temperature condition at each passage for normal operation, a by-pass line within said port cap and connecting the passages to enable fluid to be circulated through the apparatus, said by-pass line including a bore located between said passages and extending transversely thereof, a reciprocal slide in the bore having a valving land normally presented in an obstructing attitude to an opening in the by-pass line, the slide having a passageway to be communicated to said opening to open the by-pass line, spring means located at one end of the bore and biasing said slide normally to said attitude to close the by-pass line, a thermal element located at the opposite end of said bore and bearing against said slide in opposition to said spring means, the thermal element expanding and contracting on a rise and fall in temperature, passage means inside the port cap communicating the fluid being pumped to said thermal element which expands to shift the slide to open the by-pass line at a predetermined abnormal fluid temperature, said by-pass line including first and second ports spaced from one another inside the port cap, said ports communicating respectively with the inlet passage and the outlet passage, said ports each communicating with said bore and one of said ports being normally closed by said valving land, wherein the thermal element is located within an enlarged chamber at one end of the bore, and wherein said passage means comprises two passages, one for directing inlet fluid into said chamber and one for returning inlet fluid from said chamber to said inlet passage.

* * * * *